Patented Nov. 20, 1923.

1,474,674

UNITED STATES PATENT OFFICE.

ARTHUR JENS MARINUS JENSEN, OF RANDERS, DENMARK.

METHOD OF MANUFACTURING YEAST.

No Drawing. Application filed September 20, 1920. Serial No. 411,590.

*To all whom it may concern:*

Be it known that I, ARTHUR JENS MARINUS JENSEN, a subject of the King of Denmark, resident of Randers, in the Kingdom of Denmark, director, have invented certain new and useful Improvements in Methods of Manufacturing Yeast (for which I have filed applications for patents as follows, Denmark, Sept. 12, 1919; Sweden, Sept. 17, 1919); and I do hereby declare the following to be a full, clear, and exact description of the invention, such as will enable others skilled in the art to which it appertains to make and use the same.

The present invention relates to a method of producing a yeast product which may serve as a substitute for the ordinary, so-called, compressed yeast, in bakeries and the like.

The violent manipulations which have been employed heretofore in the known methods of producing compressed yeast, for separating the yeast from the mash after the fermentation, to bring it to the consistency best suited for the trade, have an exceedingly weakening effect on the living power and strength of the individual cells. Moreover, the cells after completion of these manipulations are still further weakened by the yeast being kept for a more or less long time before it is used, without their receiving any nourishment from their surrounding substances, so that they are forced to live on their own reserves, particularly on their content of glycogen. In consequence of their generally weakened condition they are, moreover, greatly exposed to the attacks of invading bacteria. In consequence of all these conditions mentioned the compressed yeast heretofore produced will keep fresh for a short time only, and a large number of cells have to be used in baking bread in order that the desired effect in the dough may be produced.

The object of the present invention is to produce a durable trade article which may, in baking bread and the like, serve as a substitute for the large amount of compressed yeast, although it contains considerably less cells than the latter, as these cells have, after fermentation, not been subjected to the violent and detrimental manipulations mentioned, and moreover, during storage, have had the possibility of living on nourishing substances surrounding the cells for months.

With the object in view of producing such a product a yeast mash of the same consistency as compressed yeast (or dryer than the latter) and with the same raising capacity in dough, the following method is employed:

A doughy or almost doughy mash is prepared of sifted flour of any kind, or of peeled potatoes, or a mixture thereof. This mash may be sugared wholly or partly with the aid of malt meal or an extract of diastase (in order that the finished product shall not become too dark, the temperature should in doing so not exceed 50°-55° C.) or the mash may be employed unsugared, in which case a small quantity of cane sugar or, still better, invert sugar (for example about one part of sugar to eighty parts of mash) should be added. To this mash ordinary seed yeast is added, which may be prepared by any of the known methods, but which should preferably not be dry-pressed more than necessary so as to maintain the desired consistency of the mash after mixing. This added yeast, of which a comparatively large amount should be taken (for a doughy mash yeast of a consistency equal to that of common compressed yeast, preferably one part of yeast to four parts of mash), is well mixed with the mash, which at this time should have a temperature between 15° and 25° C. Besides, a growth of lactic acid bacteria preferably at a ratio of one part of such growth to 150 parts of yeast mash, may be added. The whole mass is now allowed to ferment at the initial temperature for about 24 hours, with or without ventilation. Thereupon the fermentation is discontinued, in order that a sufficient amount of nutrient may remain in the mash, for example, by thoroughly working down the mass and bringing it to the desired consistency, after which it is kept for about 24-28 hours at a temperature of about 4° C. If the mass, after fermentation, is dryer than desired, some water may be added while working it down.

If, after fermentation, the mass is of a softer consistency than desired, it may in this case be subjected to a slight drying by keeping it for a suitable time (about 24 hours) at a temperature of about 25° C. It may also be slightly compressed in a filter press, whereby the filter cloths will remove a part of the moisture.

If the lactic acid bacteria mentioned are employed, the lactic acid produced by these bacteria will, after 24 hours, have so powerful a checking effect on the fermentation, that the latter will cease in working down the mass.

When a very stiff mash and a subsequent somewhat longer drying at about 25° C. is employed, a pulverulent product of high durability is obtained.

After the yeast mash has been brought to the desired consistency and the fermentation has been discontinued, the same is ready for use. Partly by reason of the development which has taken place, and partly by reason of the fact that the individual cells, in consequence of the peculiar method of fermentation and the further treatment, are in a by far more virulent condition than is the case with the cells in ordinary compressed yeast, a given amount of this yeast mash will have the same raising power in dough as an equal amount of common compressed yeast, notwithstanding the fact that the number of cells in the yeast mash is considerably less than that of the cells in the compressed yeast.

As the already more virulent cells have, while being stored, always the possibility of living on nutrient remnants surrounding them, they remain in virulent condition and are thus better able to withstand the attacks of bacteria (wherein they are assisted by the still live and unweakened lactic acid bacteria) and the yeast mash product will keep fresh and active for a considerably longer time than will the ordinary compressed yeast.

It will also be seen from the preceding specification that it is much cheaper to prepare than ordinary compressed yeast, as the consumption of raw materials per unit of weight of the finished product is much less.

I claim—

The method of producing well-keeping yeast, which comprises seeding a dough with virulent yeast, allowing the mash to partially ferment, adding sufficient lactic acid bacteria to prevent further fermentation and bringing the mash to the consistency of compressed yeast without removing the yeast nutrients, and forming into cakes for use as yeast.

In testimony that I claim the foregoing as my invention, I have signed my name.

ARTHUR JENS MARINUS JENSEN.

Witnesses:
MAX KONGSMAR,
MARTIN BRUIN.